(12) United States Patent
Harris et al.

(10) Patent No.: US 10,997,247 B1
(45) Date of Patent: May 4, 2021

(54) SNAPSHOT TRACKING USING A GRAPH DATABASE

(71) Applicant: Amazon Technologies, Inc., Seattle, WA (US)

(72) Inventors: Frank Harris, Wenatchee, WA (US); Alok Nath Katiyar, Lake Forest Park, WA (US)

(73) Assignee: Amazon Technologies, Inc., Seattle, WA (US)

(*) Notice: Subject to any disclaimer, the term of this patent is extended or adjusted under 35 U.S.C. 154(b) by 446 days.

(21) Appl. No.: 15/966,448

(22) Filed: Apr. 30, 2018

(51) Int. Cl.
*G06F 16/11* (2019.01)
*G06F 16/901* (2019.01)
*G06F 11/14* (2006.01)

(52) U.S. Cl.
CPC ...... *G06F 16/9024* (2019.01); *G06F 11/1448* (2013.01); *G06F 16/128* (2019.01); *G06F 2201/84* (2013.01)

(58) Field of Classification Search
CPC .... G06F 16/128; G06F 3/065; G06F 11/1448; G06F 16/9027; G06F 11/1446; G06F 2201/84
See application file for complete search history.

(56) References Cited

U.S. PATENT DOCUMENTS

| | | | |
|---|---|---|---|
| 9,176,871 B1 * | 11/2015 | Serlet | G06F 3/0619 |
| 9,298,723 B1 * | 3/2016 | Vincent | G06F 16/172 |
| 9,348,752 B1 * | 5/2016 | Parakh | G06F 11/1446 |
| 9,635,132 B1 * | 4/2017 | Lin | G06F 3/0652 |
| 9,740,583 B1 * | 8/2017 | Brandwine | G06F 11/2056 |
| 10,324,806 B1 * | 6/2019 | Kucherov | G06F 3/0688 |
| 10,620,866 B1 * | 4/2020 | Kumar | G06F 16/288 |
| 10,635,643 B2 * | 4/2020 | Muthuswamy | G06F 16/13 |
| 10,656,865 B1 * | 5/2020 | Janse van Rensburg | G06F 3/064 |
| 2014/0330784 A1 * | 11/2014 | Sundaram | G06F 3/0604 707/639 |
| 2014/0372381 A1 * | 12/2014 | Sorenson | H04L 67/1097 707/649 |
| 2017/0364411 A1 * | 12/2017 | Fan | G06F 3/067 |

* cited by examiner

*Primary Examiner* — Merilyn P Nguyen
(74) *Attorney, Agent, or Firm* — Nicholson De Vos Webster & Elliott LLP

(57) ABSTRACT

Techniques for maintaining a graph associated with snapshots are described. In some embodiments, a snapshot service maintains one or more graphs in a graph database. The snapshot service maintains a graph data structure having a plurality of vertices corresponding to a plurality of snapshots, wherein each vertex of the plurality of vertices is at least a parent to or a child of another vertex, and each child vertex of the plurality of vertices comprises a value representing a number of chunks of data referenced in the corresponding snapshot corresponding to of the child vertex that are not referenced in the snapshot corresponding to the parent vertex of the child vertex. The snapshot service further determines a total number of unique chunks of data attributed to the plurality of snapshots based at least in part on traversing the graph data structure.

20 Claims, 14 Drawing Sheets

SNAPSHOT TRACKING USING A GRAPH DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for snapshot tracking using a graph database are described. According to some embodiments, one or more graphs are created or updated in response to the creation or deletion of a snapshot in a service provider system. In some embodiments, each snapshot has an associated manifest that identifies portions of data, referred to herein as "chunks," such that subsequent snapshots can reference chunks that were previously backed up without creating new copies in the backup media. By introducing graphs to track snapshots and attributing resource usage to nodes in the graph corresponding to the backups, in some embodiments the resource usage attributable to backups of particular users can be determined in a significantly more time-efficient and resource-efficient manner—especially in large-scale service provider systems with large amounts of data, backups, and users. In some embodiments, the snapshot provider can provide users with the ability to view their backup resource usage and manage backups via a graph-based user interface.

Figure 1:
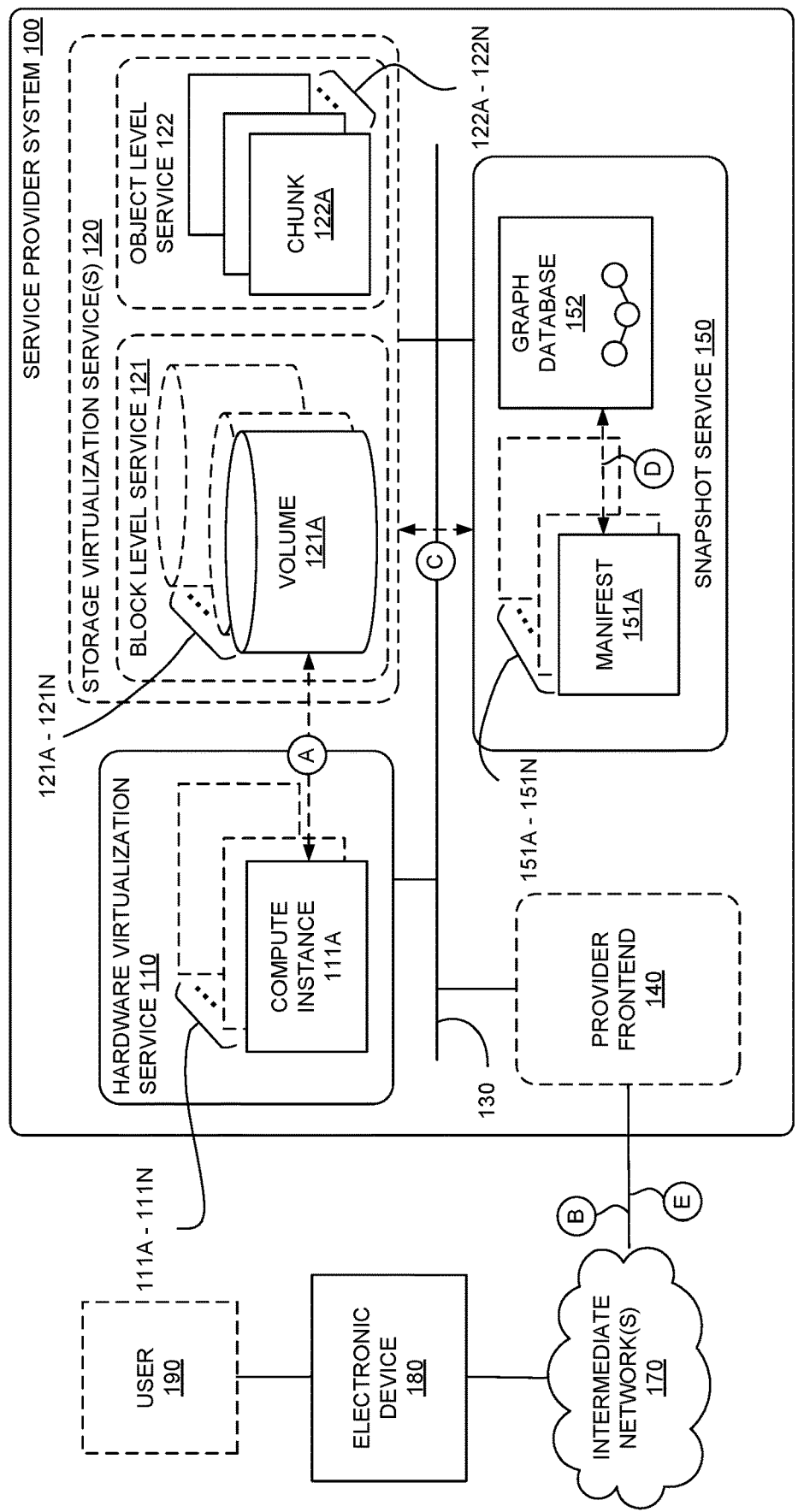
FIG. 1 is a block diagram illustrating a service provider system implementing hardware and storage virtualization services and a snapshot service for backing up data in virtualized storage according to some embodiments.

FIG. 1 is a block diagram illustrating a service provider system 100 implementing hardware and storage virtualization services 110 and 120, and snapshot service 150 for backing up virtualized storage according to some embodiments. Service provider system 100 further includes provider frontend 140, which may include one or more web servers and/or application servers to facilitate communications with electronic device 180 via intermediate network(s) 170.

At a high level, service provider system 100 provides the ability to utilize one or more of a variety of types of computing resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as hardware virtualization service 110 that can execute compute instances and storage virtualization service 120 that can store data objects, etc. Electronic device 180 accesses these services. In some embodiments, electronic device 180 is a user device, and user 190 (or "customer") of service provider system 100 may utilize one or more user accounts that are associated with a customer account, though these terms may be used somewhat interchangeably depending upon the context of use. User 190 and/or electronic device 180 interact with a provider network 100 across intermediate network(s) 170 (e.g., the internet) via provider frontend 140, such as through use of application programming interface (API) calls or via a console, website, application, etc. Provider frontend 140 may include one or more web servers and/or application servers to provide access to services (e.g., hardware virtualization service 110, storage virtualization service 120, snapshot service 150, etc.).

Although not shown, service provider system 100 is implemented with one or more processors, one or more computer-readable media, and one or more network interfaces. Processor(s) can include microprocessor, controller, microcontroller, central processing unit, digital signal processor, application specific integrated circuit, field programmable gate array, other electronic circuitry, or a combination of one or more of the preceding processors. Computer-readable media can include non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). Computer-readable media store code and/or data for processor(s). Service provider system 100 further includes one or more wired or wireless network interfaces, allowing service provider system 100 to transmit data to and receive data from other computing devices (e.g., electronic device A80, other components of service provider system 100), typically across one or more networks (e.g., Local Area Networks (LANs), the internet) such as intermediate network(s) 170. The processor(s), computer-readable media, and network interface(s) of service provider system 100 are coupled together typically through one or more interconnects 130 (e.g., busses, bridges, networks). Service provider system 100, including its various processor(s), computer-readable media, and network interface(s), may be located within a single computer, single data center or geographically distributed across multiple, networked data centers.

The components of service provider system 100 illustrated in FIG. 1 (e.g., hardware virtualization service 110, storage virtualization service 120, provider frontend 140, and snapshot service 150) can each be implemented with one or more processors coupled to computer-readable media and, optionally, network interfaces. The services may be implemented as computer programs comprising instructions stored in computer-readable media and executable by one or more processors. In some embodiments, separate processor(s), computer-readable media, and optional network interfaces are provisioned for each component of service provider system 100.

To provide computing resource services to customers, service providers often rely upon virtualization techniques. Hardware virtualization service 110 provides users with the ability to create and control one or more compute instances 111A-111N. A compute instance 111 may include a virtual machine (VM) using a guest operating system (OS) that operates using a hypervisor that may or may not further operate on top of an underlying host OS, a container that may or may not operate in a VM, or an instance that can execute on "bare metal" hardware without an underlying hypervisor. Each user may have one or more compute instances 111, and compute instances 111 may be shared among users. With control of a compute instance 111, a user may directly utilize a compute instance hosted by service provider system 100 to perform a variety of computing tasks, or may indirectly utilize a compute instance by submitting code to be executed by service provider system 100, which in turn utilizes a compute instance to execute the code (typically without the user having any control of or knowledge of the underlying compute instance(s) involved).

Storage virtualization service 120 provides users with the ability to store data. Storage virtualization service 120 can provide block level service 121 and/or object level service 122, either of which may be used to store code (e.g., computer programs) and/or data (for use by computer programs). Object level service 122 is a data repository that stores data as objects (e.g., a JPEG image file), and may include optional metadata that describes the underlying object. In some embodiments, object level service 122 stores chunks 122A-122N which, as described herein, are created by snapshot service 150. While the depicted embodiment shows storage virtualization providing volumes 121A-121N as part of block level service 121 and storing backup chunks 122A-122N of user data in object level service 122, storage virtualization service 120 provides volumes and stores chunks via separate computer-readable media to provide data redundancy, as storage virtualization service 120 can be implemented across an array of non-volatile computer-readable media, such as magnetic disks, flash memory, phase-change memory, and/or other electronic devices able to store large amounts of data.

Block level service 121 offers a user the ability to configure one or more volumes 121A-121N (or "logical drives") to act as drives or disks for the user's compute instances. In some embodiments, a volume may be a construct that exists at the logical operating system level that provides an operating system (e.g., of or used by a compute instance) with a logical storage area. As shown, volume 121A is associated with compute instance 111A. Each compute instance 111 may have one or multiple volumes 121, and each volume 121 may be accessible by one or more compute instances 111. Volumes in block level service 121 typically offer compute instances faster data storage and retrieval as compared to data stored in object level service 122. The virtual drives can store data as blocks, where a block is generally an incremental amount of data. For example, a block may store 1 kilobyte (KB), 2 KB, 4 KB, 8 KB, 16 KB, 256 KB, 512 KB, 1024 KB, etc., of data. Thus, in an example system with 512 KB blocks, a user storing 768 KB of data would store data in two blocks (one being partially full) on the virtual drive.

In some embodiments, block level service 121 and object level service 122 are separate services within service provider system 100 (i.e., not as part of storage virtualization service 120). In some embodiments, object level service 122 is implemented on top of block level service 121, or block level service 121 is implemented on top of object level service 122.

Snapshot service 150 provides users with the ability to incrementally backup their volumes in block level service 121 rather than backing up the entire volume (e.g., with a disk image). For example, if a volume offered 500 gigabytes (GB) of storage, and all but 512 KB of the volume was empty, snapshot service 150 backs up only the used portion of the volume. Further, subsequent backups refer to data that was previously backed up to minimize the amount of data duplication across backups. Thus, snapshots reduce the amount of redundant backup data stored in a backup media relative to "full" backups that create a complete copy of the data.

Snapshot service 150 represents backups with snapshots, where a snapshot can be used to recreate the volume at some point in time. If the user wants to return to a prior volume state, they can do so using the snapshot reflecting that state. In addition to taking and maintaining snapshots of volumes, snapshot service 150 may maintain a snapshot policy associated with each particular volume. A snapshot policy controls when snapshot service 150 takes a snapshot of a volume based on certain parameters such as elapsed time between snapshots, at a certain time or certain day, or once some threshold number of changes to the volume have occurred.

Figure 2:
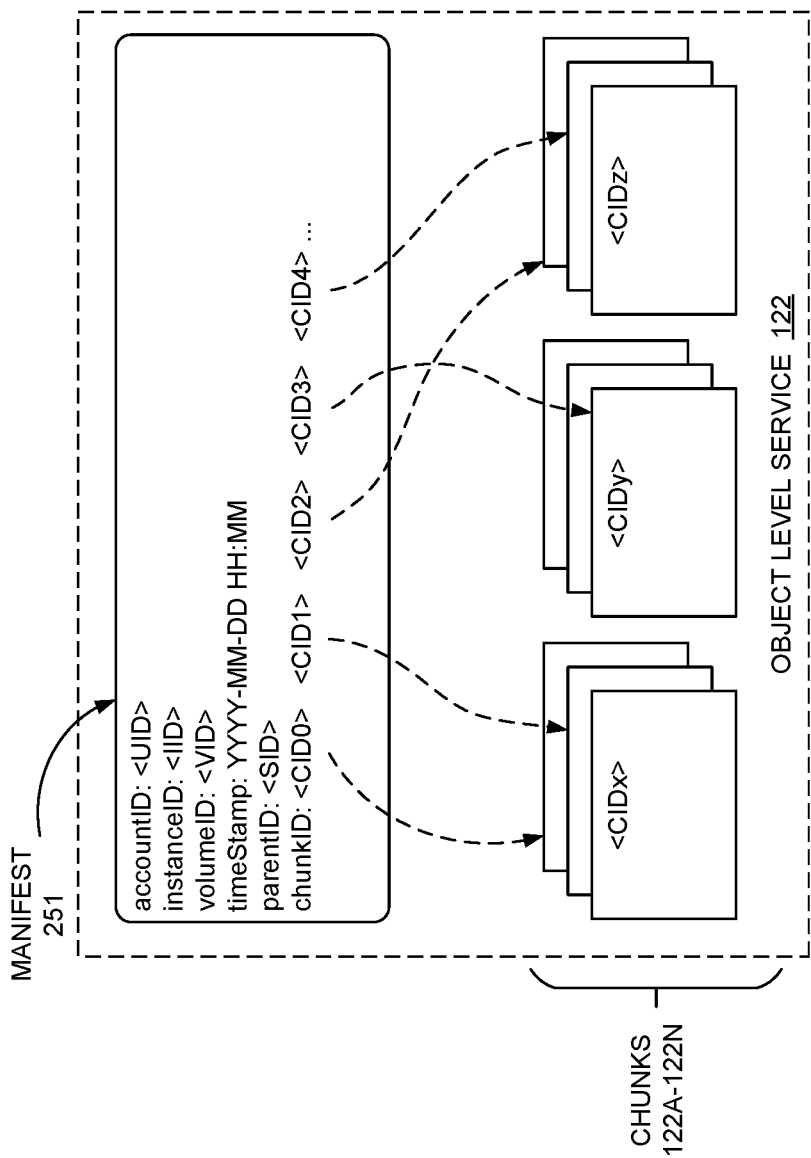
FIG. 2 illustrates an exemplary manifest according to some embodiments.

A snapshot has a corresponding manifest 151, an example of which is described below with reference to FIG. 2. When snapshot service 150 takes a snapshot of a volume, snapshot service 150 can create a new manifest and insert a vertex in a graph database 152. In some embodiments, snapshot service 150 stores manifests in object level service 122. A given snapshot may have one or more associated vertices in graph database 152. A graph is a data structure represented by vertices (sometimes referred to as nodes) connected by edges. Each vertex represents a snapshot and may include various data about the snapshot (e.g., size of snapshot, date of snapshot, etc.). The edges in a graph relate the snapshots to one another in a parent-child relationship, where an older snapshot (in time) may be the parent to one or more later snapshots, or children. In some embodiments, graph database 152 includes a graph for each snapshot family, where a family is a group of snapshots sharing at least one chunk (e.g., one or more blocks), as described below. In such cases, a family may span multiple volumes. In other embodiments, graph database 152 maintains a graph for each volume. In other embodiments, graph database 152 includes a graph for each snapshot family and another graph for each volume. In such embodiments, snapshot service 150 may perform graph updates as described herein on at least two graphs—one for the volume, and another for the family.

As indicated by circle "A" in FIG. 1, compute instance 111A has an associated volume 121A. At circle "B," service provider system 100 receives a command to backup volume 121A or to configure a backup schedule or policy for a volume. At circle "C," in response to the command or to the backup schedule, snapshot service 150 backs up volume 121A, possibly storing chunks of data associated with the volume in object level service 122, though in some embodiments the chunks can be stored elsewhere (e.g., at a different location and/or device of block level service 121, or with another service). Snapshot service 150 takes a snapshot of volume 121A and creates a manifest associated with the snapshot. At circle "D," snapshot service 150 updates graph database 152 to reflect the relationship of the new snapshot to other snapshots associated to volume 121A and/or to other volumes. For example, if a snapshot is a second snapshot of volume 121A, snapshot service 150 updates a graph within graph database 152 so that the graph has a new child vertex to a vertex associated with the first snapshot. In addition, snapshot service 150 stores information with the child vertex (e.g., the number of chunks in the second snapshot that were not in the first snapshot).

In some embodiments, a manifest is a data structure that includes references to the chunks that make up a snapshot and/or identifying information or metadata associated with the snapshot. FIG. 2 illustrates an exemplary manifest 251 according to some embodiments. In this example, manifest 251 includes references (e.g., pointers or other identifiers) to the chunks that make up the snapshot. A chunk often represents some amount of space on a volume, and may be smaller, larger, or the same size as a block. For example, a chunk may include 2, 4, 8, 16, etc., blocks of data. The size of a chunk may be fixed or variable depending on user preferences or on the characteristics of the underlying media hardware provisioned for the volume.

Manifest 251 further includes other identifying information or metadata. As shown, the identifying information in manifest 251 includes an account identifier (to identify the user or customer account), an instance identifier (to identify the compute instance), a volume identifier (to identify the volume associated with the compute instance), a snapshot identifier to identify the parent or previous snapshot, and a timestamp. Identifying information may be tagged (e.g., "accountID:") or, if the manifest has a fixed format, may appear in the appropriate location within the manifest. Other embodiments may have more or less identifying information than that depicted in manifest 251. References to chunks may be paths, pointers, memory addresses, unique metadata labels, or the like to directly or indirectly identify the location of the backed-up data within the chunk. Chunks may be stored in object storage service 122 or in some other media (not shown).

Figure 3:
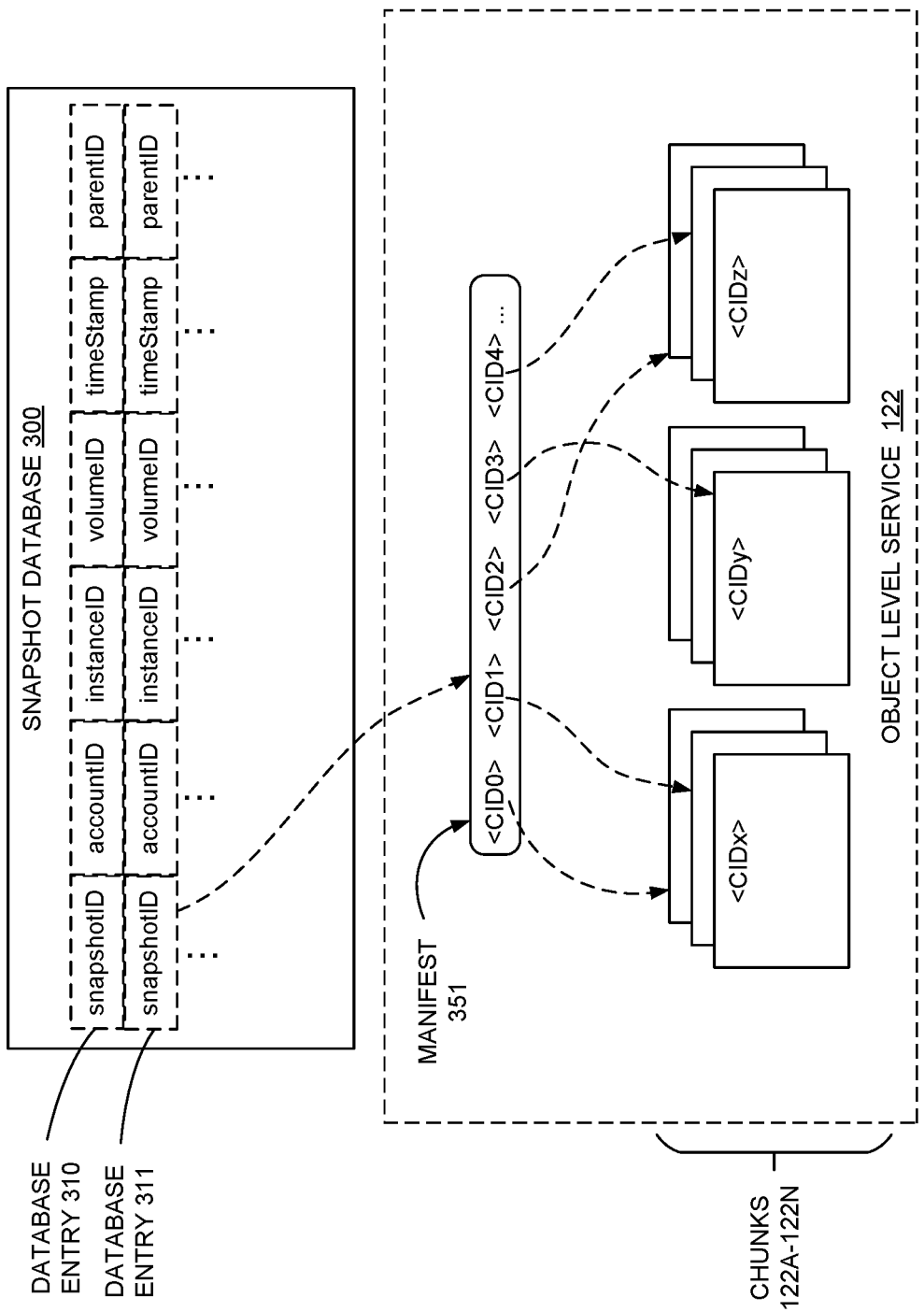
FIG. 3 illustrates another exemplary manifest according to some embodiments.

FIG. 3 illustrates another exemplary manifest 351 according to some embodiments. In this embodiment, manifest 351 only contains references to chunks (e.g., pointers or other identifiers). In this embodiment, snapshot service 150 (not shown) maintains a snapshot database 300 that includes database entries like entry 310 that relate to a particular snapshot. Each entry may include one or more fields containing identifying information about the snapshot, such as the identifying information described above with reference to FIG. 2 (e.g., snapshotID, accountID, instanceID, volumeID, timestamp, parentID, etc.). The snapshotID field or another field may reference the manifest associated with the snapshot. For example, entry 311 has a snapshotID that acts as a reference to manifest 351. One or more of snapshot database 300, snapshot manifests like manifest 351, and chunks 122A-122N may be stored in object level service 122 or in some other media (not shown).

Figure 4:
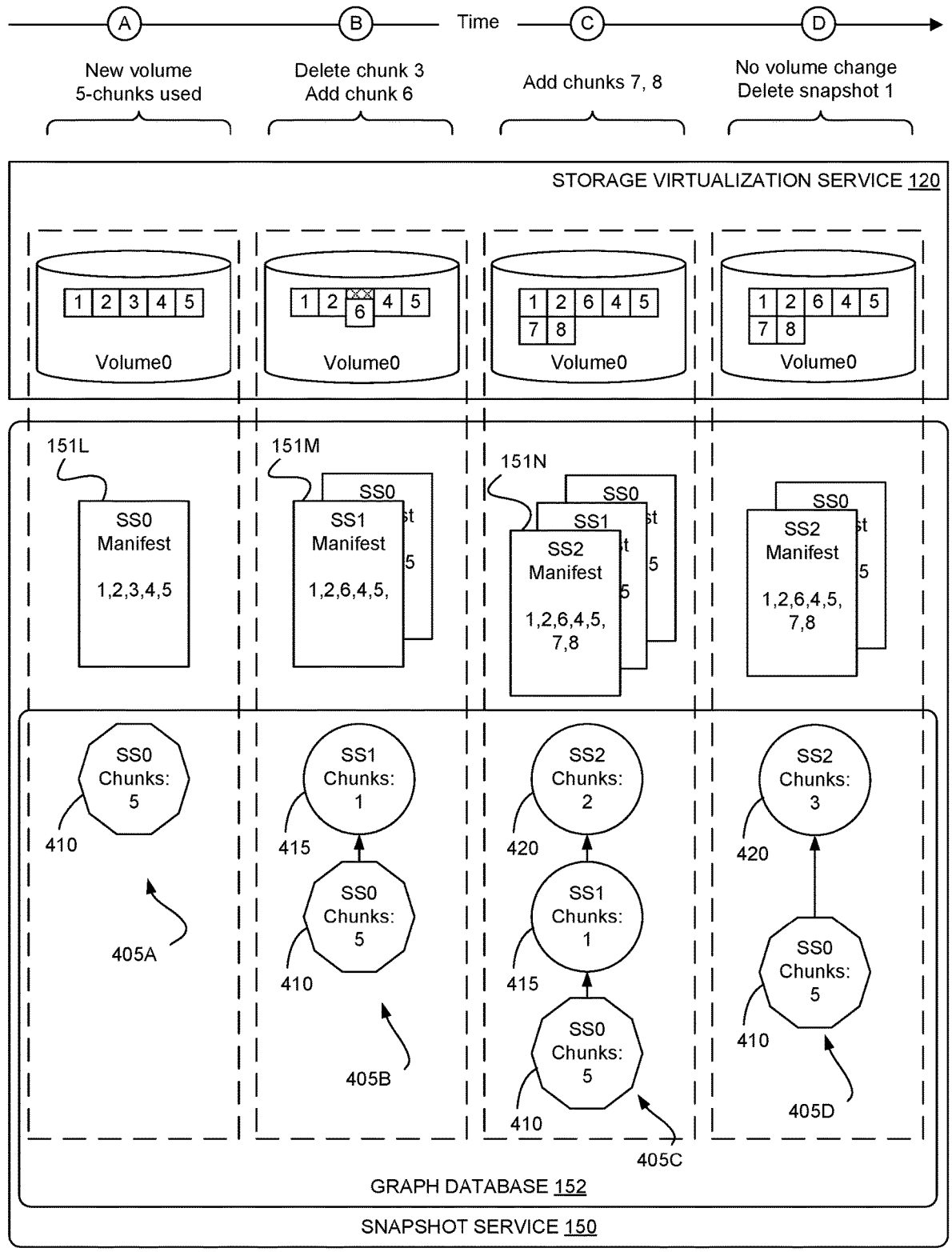
FIG. 4 illustrates a sequence of snapshots of a volume and the corresponding graph according to some embodiments.

FIG. 4 illustrates a sequence of snapshots of a volume and the corresponding graph 405 according to some embodiments. As indicated at the top of FIG. 4, the sequence illustrates the changes to a particular volume within storage virtualization service 120 and the associated operations of snapshot service 150 at four points in time, denoted A through D. Sometime before time A, a user (or customer) has created a new volume within storage virtualization service and stored data within the volume that spans five chunks. At time A, either in response to a backup command or an automatic backup schedule, snapshot service 150 takes a snapshot of the volume and creates manifest 151L, which references chunks 1-5. In addition, snapshot service 150 creates a new graph 405 within graph database 152 and creates vertex 410 within graph 405. Vertex 410 represents the snapshot at time A and has associated data indicating that the snapshot references five chunks of data.

Sometime before time B, the user has deleted the data in the third chunk in the volume and added data in a sixth chunk in the volume. For example, the user may have overwritten the data in the third chunk with new data, forming the sixth chunk. At time B, snapshot service 150 takes a snapshot of the volume and creates manifest 151M, which references chunks 1, 2, and 4-6. In addition, snapshot service 150 updates graph 405 with a new vertex 415 to represent the snapshot at time B and having an indication that the snapshot references one new chunk of data. Because the snapshot taken at time B is of the same volume as the snapshot taken at time A, snapshot service 150 connects the vertex representing the former to be a child of the vertex representing the latter.

Sometime before time C, the user has added data spanning chunks 7 and 8 in the volume. At time C, snapshot service 150 takes a snapshot of the volume and creates manifest 151N, which references chunks 1, 2, and 4-8. In addition, snapshot service 150 updates graph 405 with a new vertex 420 to represent the snapshot at time C and having an indication that the snapshot references two new chunks of data. Again, because the snapshot taken at time C is of the same volume as the snapshot taken at time B, snapshot service 150 connects the vertex representing the former to be a child of the vertex representing the latter.

At time D, a backup may be deleted by a user or per an automatic cleanup process. In this example, the second snapshot (taken at time B) is to be deleted. When deleting the snapshot, snapshot service 150 deletes vertex 415 and updates vertex 420 to be a child of vertex 410. Because one of the chunks referenced in the snapshot taken at time B (chunk 6) is also referenced in the snapshot taken at time C but not in the snapshot taken at time A, snapshot service 150 updates vertex 420 to indicate that it references three unique chunks relative to its new parent.

In some embodiments, snapshot service 150 differentiates between the first snapshot of a volume (sometimes referred to as a base snapshot) and subsequent snapshots of the same volume (sometimes referred to as incremental snapshots). Note that the distinction between base and incremental snapshots may be encoded within data associated with vertices of the graph, within the metadata of snapshot manifests, or not at all. For illustration purposes in FIG. 4 and in subsequent figures, a decagon indicates a base snapshot and a circle indicates an incremental snapshot.

Figure 5:
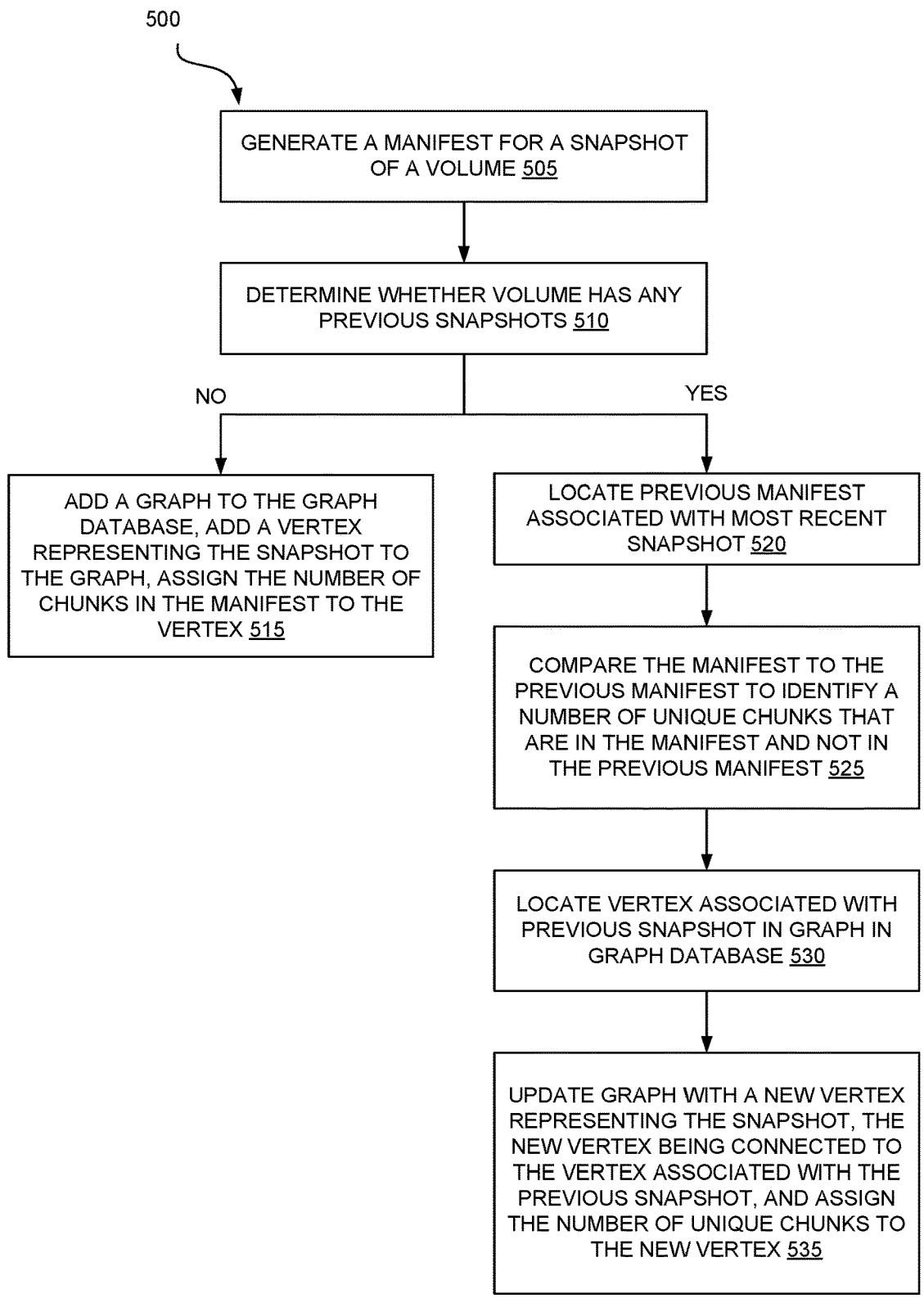
FIG. 5 is a flow diagram illustrating operations to add or update a graph in response to a new snapshot according to some embodiments.

FIG. 5 is a flow diagram illustrating operations 500 to add or update a graph in response to a new snapshot according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by snapshot service 150. Operations 500 include, at block 505, generating a manifest for a snapshot of the volume. The manifest can identify each chunk associated with the volume, and may identify other metadata associated with the snapshot as described above with reference to FIG. 2. At block 510, the operations 500 include determining whether there are any previous snapshots of the volume or whether the volume was created based on an existing snapshot. In some embodiments, snapshot service 150 maintains a list of all snapshots of a particular volume, which can be used to make the determination at block 510.

If there are no related snapshots to the volume, operations continue to block 515. At block 515, the operations include adding a new graph to graph database 152 and adding a vertex representing the first snapshot of the volume to the graph. The operations further include associating various information about the snapshot to the vertex (e.g., the number of unique chunks associated with the snapshot). The information may be in the form of attribute-value pairs (e.g., an attribute, "unique chunks" that has a corresponding numeric value; attributes identifying the account, volume, and/or compute instance to which the associated snapshot belongs).

If there are previous snapshots related to the volume, operations continue to block 520. At block 520, the operations include locating the previous manifest associated with the most recent snapshot. Note that the most "recent" snapshot may not correspond to the most recent snapshot in time. For example, if snapshot service 150 takes snapshots A, then B, then C, of a volume in sequence, and the user restores the volume to snapshot B, the most recent would be snapshot B, not C, since changes to the restored volume would be relative to snapshot B. At block 525, the operations include comparing the manifest of the previous snapshot with the new snapshot to identify how many chunks are in the new snapshot that are not in the previous snapshot (e.g., the number of chunks unique to the new snapshot). Continuing to block 530, the operations include locating the vertex associated with the previous snapshot in a graph in graph database 152. At block 535, the operations include updating the graph by adding a new vertex representing the snapshot, connecting the new vertex as a child to the vertex associated with the previous snapshot, and assigning the number of unique chunks to the new vertex.

Figure 6:
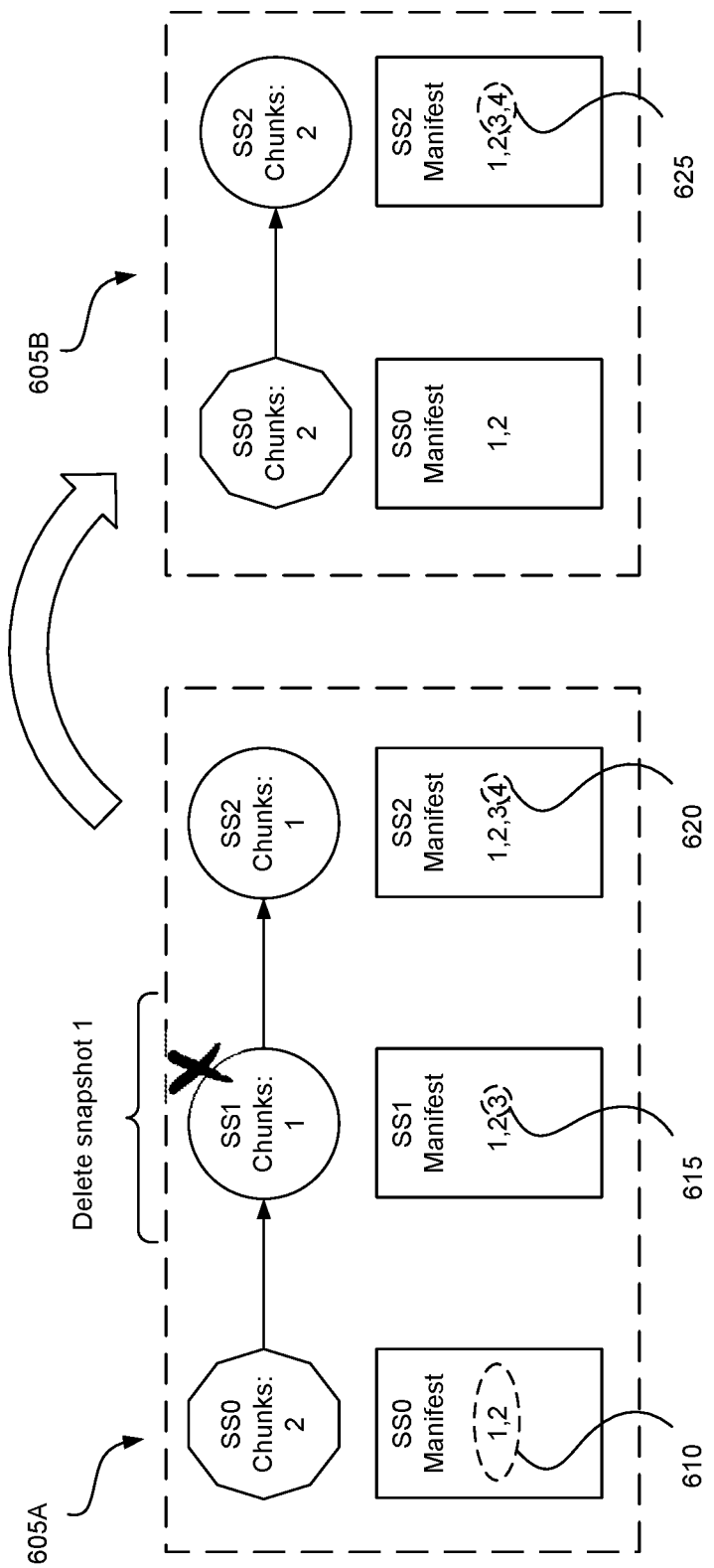
FIG. 6 illustrates updating a graph in response to deleting a snapshot associated with a vertex having a single child vertex according to some embodiments.

A user or customer may manage their snapshots in service provider system 100. In some cases, the user may want to delete a particular snapshot or have set up a schedule to automatically delete snapshots that exceed a certain age (e.g., one month, one year, etc.). FIG. 6 illustrates updating a graph 605 in response to deleting a snapshot associated with a vertex having a single child vertex according to some embodiments. As shown, graph 605A is the graph before the deletion of a snapshot, and graph 605B is the graph after the deletion. Graph 605A includes three snapshots taken in sequence, snapshot zero (SS0) (a base snapshot) and SS1 and SS2 (incremental snapshots). The manifest associated with SS0 references two chunks, 1 and 2, and the corresponding vertex in graph 605A reflects that the manifest has two unique chunks 610. The SS1 manifest references three chunks, 1-3, and the corresponding vertex in graph 605A reflects that the manifest has one unique chunk 615 relative to the manifest of its parent, SS0. The SS2 manifest references four chunks, 1-4, and the corresponding vertex in graph 605A reflects that the manifest has one unique chunk 620 relative to the manifest of its parent, SS1. Either in response to a deletion schedule or in response to a user command snapshot service 150 deletes the second snapshot (SS1) and updates the graph. Graph 605B represents the result of the updates after the deletion. As shown, the SS0 manifest, its associated vertex, and the SS2 manifest remain unchanged. Snapshot service 150 updates the vertex associated with the SS2 manifest to change its parent to the vertex associated with SS0 and to assign two unique chunks 625 relative to the manifest of its new parent.

Figure 7:
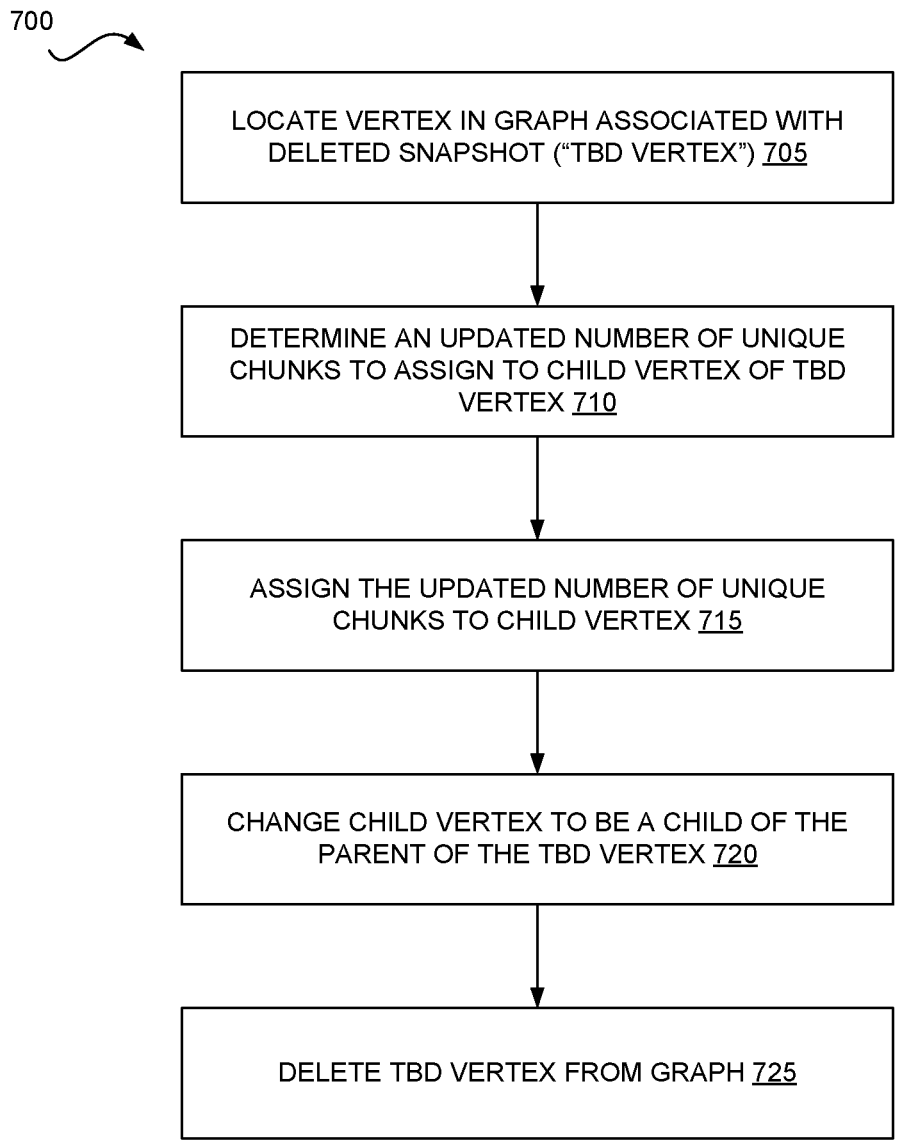
FIG. 7 is a flow diagram illustrating operations to update a graph in response to deleting a snapshot associated with a vertex having a single child according to some embodiments.

FIG. 7 is a flow diagram illustrating operations 700 to update a graph in response to deleting a snapshot associated with a vertex having a single child according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by snapshot service 150. Operations 700 include, at block 705, locating the vertex in the graph associated with the deleted snapshot. In the example illustrated in FIG. 6, the vertex SS1 corresponds to the deleted snapshot. The operations also include, at block 710, determining an updated number of unique chunks to assign to the child vertex of vertex being deleted, described in greater detail below with reference to FIG. 8. In general, determining the updated number of unique chunks involves inspecting manifests associated with vertices immediately related to the vertex associated with the deleted snapshot. At block 715, the operations include assigning the updated number of unique chunks to the child vertex of the vertex being deleted. At block 720, the operations include changing the relationships within the graph so that the child vertex of the vertex being deleted is child of the parent vertex of the vertex being deleted (e.g., in FIG. 6, from graph 605A to graph 605B). At block 725, the operations include deleting the vertex associated with the deleted snapshot from the graph.

Figure 8:
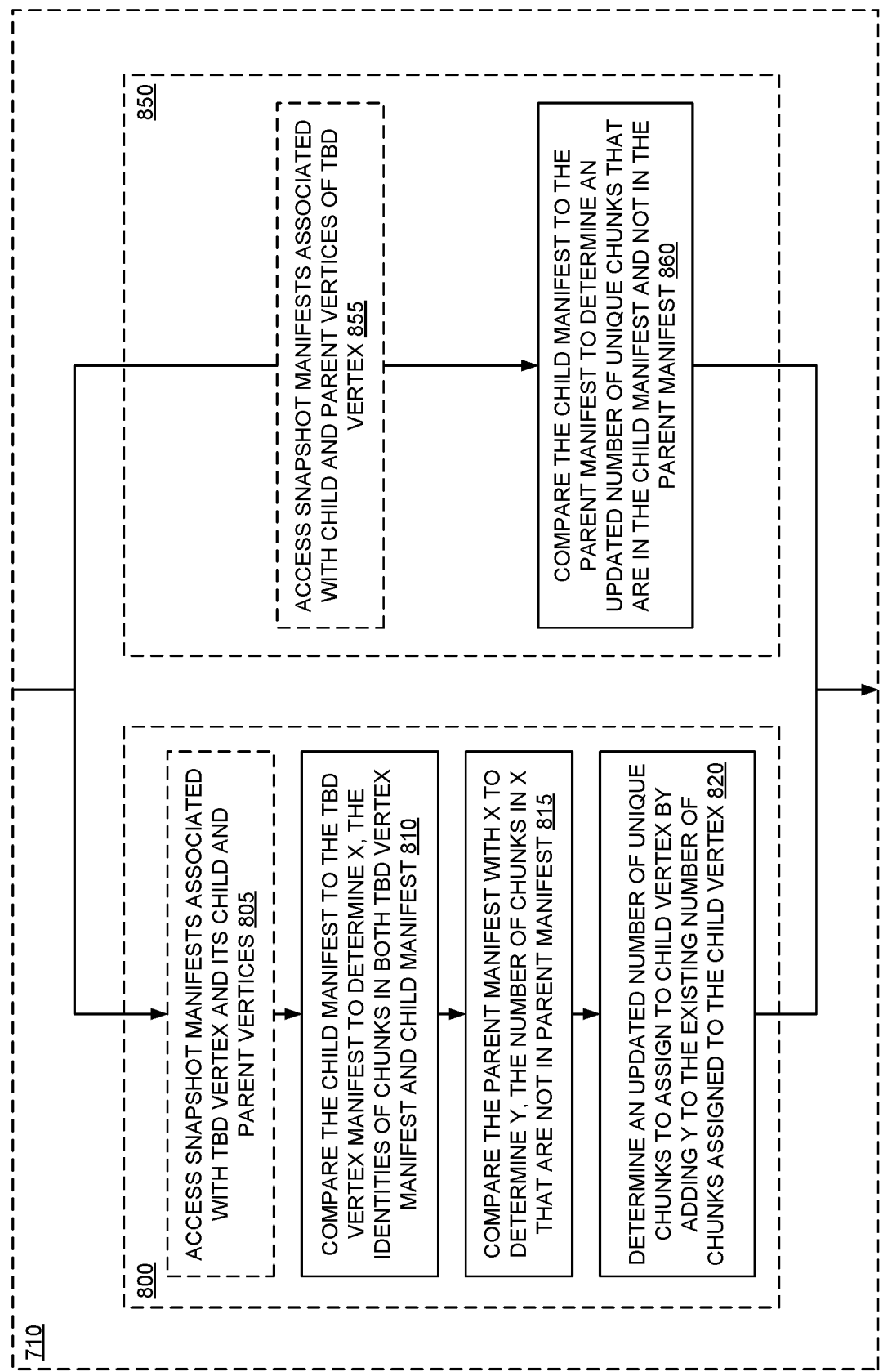
FIG. 8 is a flow diagram illustrating alternative operations to determine new values for vertices in a graph in response to deleting a snapshot.

FIG. 8 is a flow diagram illustrating alternative operations 800, 850 to determine new values for vertices in a graph in response to deleting a snapshot. Some or all of the operations 800, 850 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 and/or 850 are performed by snapshot service 150. In some embodiments, operations 800 or 850 occur as part of block 710 in FIG. 7. In some embodiments, snapshot service 150 carries out operations 800 to determine updates to a child vertex in response to deleting a snapshot associated with the child's parent vertex. At a high level, operations 800 involve computing the set of chunks in both the manifest of the deleted snapshot and the manifest of the child snapshot, subtracting that set of chunks from the set of chunks already referenced in the manifest of the parent snapshot of the deleted snapshot, and adding the number of remaining chunks after that subtraction to the existing number of chunks assigned to the child vertex of the deleted vertex. At block 805, the operations include accessing snapshot manifests associated with the snapshot being deleted and its child and parent vertices. In some embodiments, these manifests are stored in object level service 122. At block 810, the operations include comparing the chunks identified in the child manifest to the chunks identifier in the manifest of the vertex being deleted to identify a set of chunks, X, that are in both manifests. At block 815, the operations include determining which of the chunks in the set X are not in the manifest associated with the parent vertex as set Y. At block 820, the operations include determining the number of chunks to assign to the child vertex by adding the number of chunks currently assigned to the child vertex to the number of chunks in the set Y.

In other embodiments, snapshot service 150 carries out operations 850 to determine updates to a child vertex in response to deleting a snapshot associated with the child's parent vertex. At block 855, the operations include accessing snapshot manifests associated with the parent and child vertices of the snapshot being deleted. At block 860, the operations include comparing the manifest associated with the parent vertex with the manifest of the child vertex (the parent's grandchild) to identify how many chunks are in the manifest of the child that are not in the manifest of the parent. In such embodiments, the manifest of the snapshot associated with the vertex being deleted is ignored.

Sometimes the deletion of a snapshot may result in two snapshots having no common chunks. For example, a first snapshot might have chunk 1, a second snapshot adds chunk 2, and a third snapshot adds chunk 3 and deletes chunk 1. If the second snapshot were deleted, the first snapshot (chunk 1) and the third snapshot (chunks 2 and 3) would have no common chunks. In some embodiments, rather than relate the third snapshot to the first snapshot, snapshot service 150 may move the third snapshot and its children (if any) from the original graph into a new graph.

The deletion of a snapshot described with referenced to FIGS. 6-8 contemplates cases where the deleted snapshot has both a child and a parent. In some instances, the snapshot being deleted has no parent. In such cases, snapshot service 150 may assign a number of chunks to the child vertex that corresponds to the number of chunks in the associated manifest. In some instances, when the deleted snapshot has no children, snapshot service 150 may delete the vertex associated with the deleted snapshot.

Figure 9:
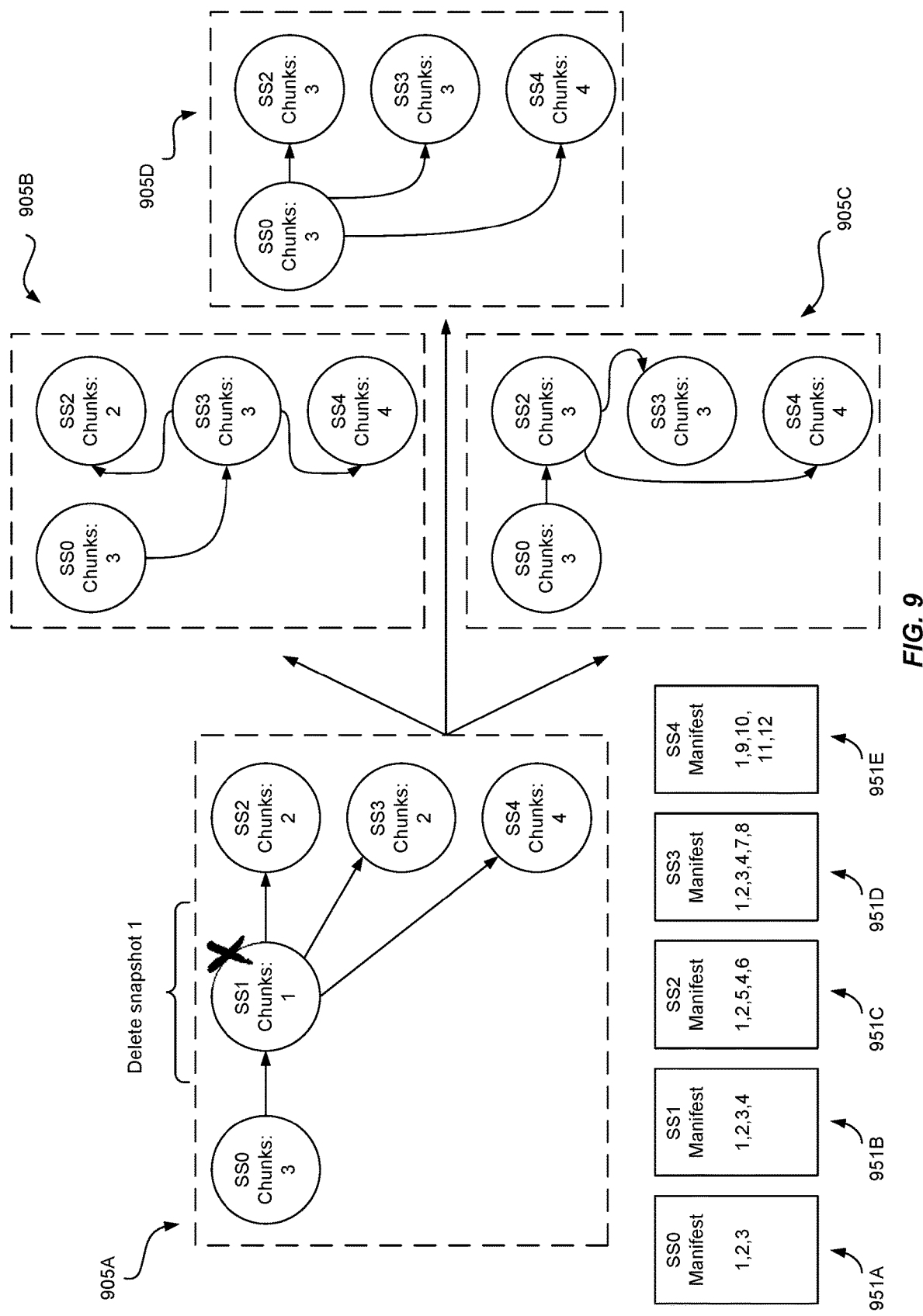
FIG. 9 illustrates updating a graph in response to deleting a snapshot associated with a vertex having multiple child vertices according to some embodiments.

As mentioned above, a user may delete a particular snapshot or schedule deletion of snapshots. FIG. 9 illustrates updating a graph 905 in response to deleting a snapshot associated with a vertex having multiple child vertices according to some embodiments. As shown, graph 905A is the graph before the deletion of a snapshot, and graph 905B, graph 905C, or graph 905D is the graph after the deletion, depending on how snapshot service 150 updates graph 905A, described below.

Initially, graph 905A includes five snapshots, SS0 (a base snapshot), SS1, and SS2-SS4 (children of SS1). Such a graph may arise if a user twice restored the volume to the state of the volume when snapshot SS1 was taken, with snapshot service 150 having taken snapshots before the first restore, between restores, and after the second restore. Manifests 951A-951E identify the chunks associated with each snapshot SS0-SS4, respectively. For example, the manifest for SS3 identifies chunks 1-4 and 7-8. Based on the manifests 951A-951E, the corresponding vertices in graph 905A indicate that SS0 has 3 unique chunks (1-3), SS1 has one unique chunk (4), SS2 has two unique chunks (5, 6), SS3 has two unique chunks (7, 8), and SS4 has four unique chunks (9-12).

Either in response to a schedule or a command, snapshot service 150 deletes the second snapshot (SS1) and updates the graph. Graphs 905B, 905C, and 905D illustrate possible graphs after the update. One approach to updating graph 905A when deleting SS1 is illustrated by graph 905B. Under this approach, snapshot service 150 determines a minimum unique block assignment for SS2-SS4. Snapshot service 150 may test each sibling (children of the deleted snapshot or the snapshot being deleted) as a candidate parent to the other remaining siblings. For example, snapshot service 150 may test SS2 as the child to SS0 and parent to SS3 and SS4 by comparing the manifests of SS0 and SS2 to determine the number of unique blocks that would be assigned to SS2, and comparing the manifest of SS2 to SS3 and SS4 to determine the number of unique blocks to assign to SS3 and SS4, respectively. Here, snapshot service 150 determines that SS3 as the child to SS0 and parent to SS2 and SS4 minimizes the chunk assignments, depicted by graph 905B. SS3 has three unique chunks relative to SS0 (chunks 4, 7, and 8), SS2 has two unique chunks relative to SS3 (chunks 5 and 6), and SS4 has four unique chunks relative to SS3 (chunks 9-12).

Another approach to updating graph 905A when deleting SS1 is illustrated in graph 905C. Under this approach, snapshot service 150 assumes the oldest sibling, SS2, likely has the most overlapping chunks with its newer siblings, and makes the oldest sibling the parent to the remaining siblings. Thus, SS3 and SS4 become children to SS2.

Another approach to updating graph 905A when deleting SS1 is illustrated in graph 905D. Under this approach, snapshot service 150 makes each child of the deleted snapshot a child of the deleted snapshot's parent. Thus, SS2, SS3, and SS4 become children to SS0. Note that in cases where the deleted snapshot has no parent, snapshot service 150 would update graph 905 to either 905B or 905C (as 905D is unavailable).

Figure 10:
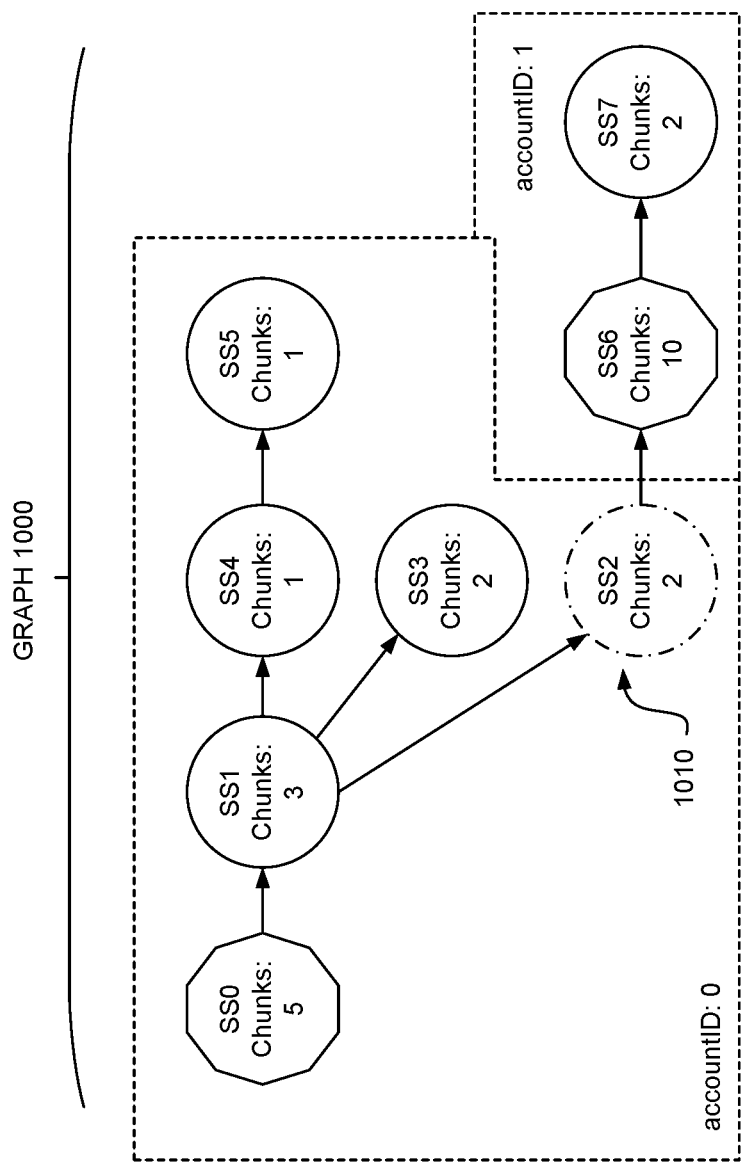
FIG. 10 illustrates a graph having snapshots associated with different accounts according to some embodiments.

FIG. 10 illustrates a graph 1000 having snapshots associated with different accounts according to some embodiments. As shown, a first account, accountID: 0, has six related snapshots, SS0-SS5, including one shared snapshot 1010 (SS2) identified by the dash-dot line. A second account, accountID: 1, may have created a new volume based on the shared snapshot 1010, and subsequently taken two snapshots, SS6 and SS7. In some scenarios, SS6 could be considered a base snapshot because it was associated with a new volume, though in some scenarios SS6 could be considered an incremental snapshot because it was created based on a snapshot of an existing volume. Assuming the only changes to the volume snapshotted as SS0, SS1, and SS2 were the addition (and not deletion) of chunks, the total number of unique chunks in that lineage would be ten (5+3+2). Thus, snapshot service 150, when creating SS6 and the associated manifest, may assign ten unique chunks to the vertex associated with SS6.

In some embodiments, snapshot service 150 only assigns the total number of chunks in the manifest associated with SS6 to the corresponding vertex in the graph after the shared snapshot SS2 has been deleted or made private. For example, snapshot service 150 might assign zero chunks to SS6 if the associated snapshot was taken without making any changes to the shared snapshot SS2. Then, when SS2 is unshared, deleted, or otherwise becomes unavailable, snapshot service 150 updates the vertex associated with SS6 to assign the ten unique chunks.

Figure 11:
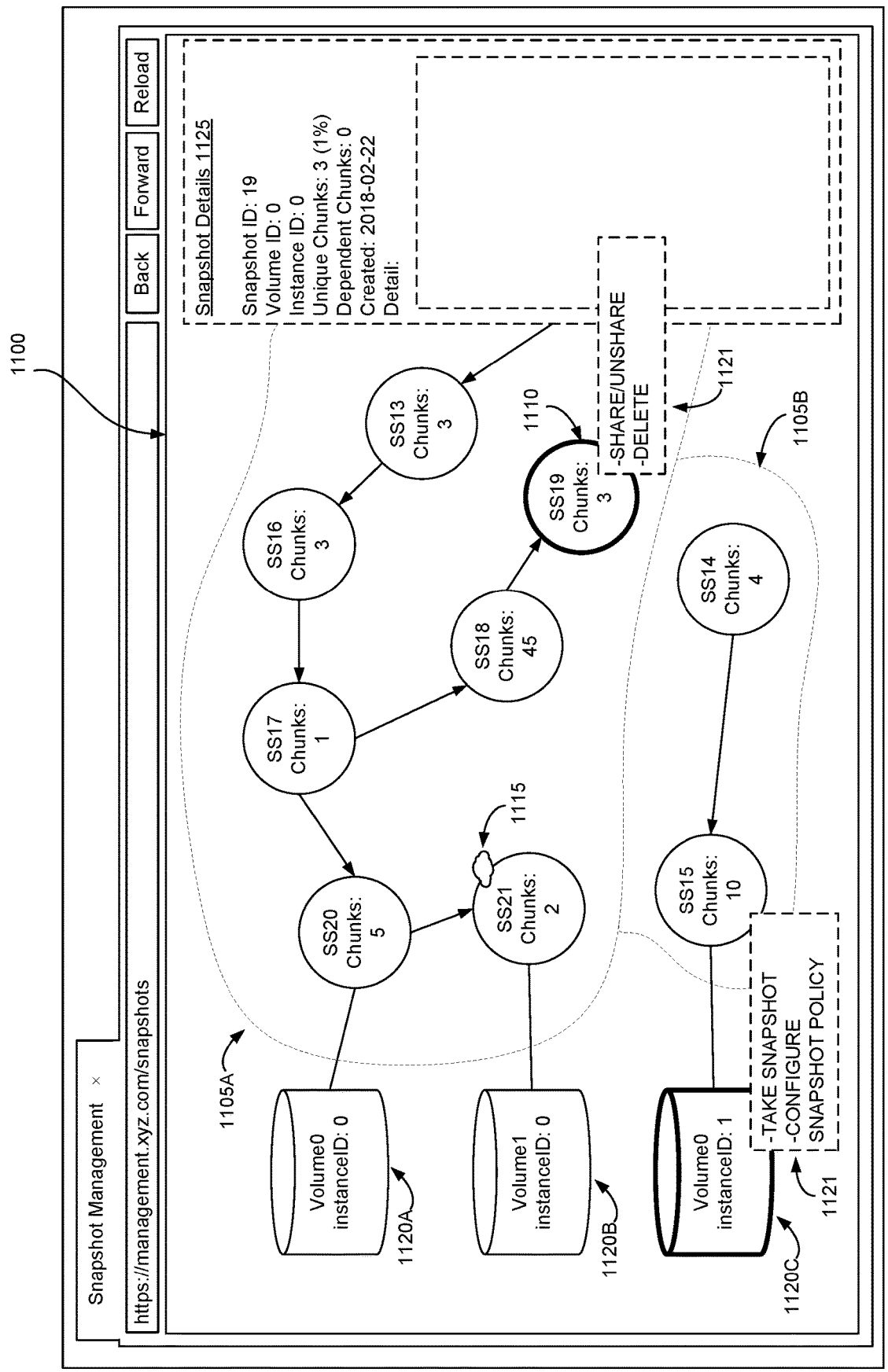
FIG. 11 illustrates certain aspects of a user interface for managing snapshots according to some embodiments.

FIG. 11 illustrates certain aspects of a user interface 1100 for managing snapshots according to some embodiments. User interface 1100 may be provided via a web browser in some embodiments. In some embodiments, the web browser is an application executed by a processor in electronic device 180. A web or application service within service provider system 100, described below, may collect or maintain information used to generate the user interface and transmit information to the web browser, causing the web browser to display the user interface. In addition, the web browser may monitor user inputs and cause electronic device 180 to transmit information to the web or application service to allow user 190 to manage their snapshots. For example, a user may cause service provider system 100 to take a snapshot of a volume or to delete an existing snapshot of a volume as described herein.

User interface 1100 displays one or more graphs associated with the user's account, e.g., graphs 1105A and 1105B. Graphs may be depicted using vertices and edges to represent snapshots and their relationships to other snapshots, as described herein. User may pan left or right, up or down, or zoom in or out, to view additional parts of the graph that may not be shown in the current view.

In some embodiments, user interface 1100 allows the user to select a snapshot via a user input. In response to the user input (e.g., a mouse click, a keyboard keypress, a touch of a touch-sensitive display, a vocal command, etc.), user interface 1100 may indicate that a particular snapshot was selected via color, weight, or other visual indication of the selection. For example, the line weight of snapshot 1110 indicates snapshot SS19 is selected. Either on selection or in response to a user input, user interface 1100 may display a menu of options associated with the snapshot. For example, menu 1121 can be displayed allowing a user to issue various commands such as to share the snapshot, stop sharing the snapshot, delete the snapshot, etc. In some embodiments, user interface 1100 includes an indicator to identify shared snapshots that are accessible by one or more other accounts. For example, indicator 1115 is a visual element (here, a representation of a cloud) that identifies snapshot SS21 as a shared snapshot, though in other embodiments other types of indicators can be used. In some embodiments, user interface 1100 allows the user to inspect indicator 1115 to determine whether another user has created a volume based on that snapshot and, in some cases, the identity of that user (e.g., subject to privacy-related limits, such as when the users are members of the same organization).

In some embodiments, upon selection of a snapshot, user interface 1100 may include a details pane 1125 to display additional information about the snapshot. Such information may include one or more of: a volume identifier that identifies the volume from which the snapshot was taken; an instance identifier of the compute instance to which the volume was associated when the snapshot was taken; a number of unique chunks assigned to that snapshot; a number of unique chunks which are referenced by a child snapshot (e.g., a dependent chunk); a timestamp of when the snapshot was taken; and/or additional details, such as user notes about the snapshot, etc. In some embodiments, user interface 1100 displays the number of unique chunks assigned to that snapshot minus the number of those chunks referenced by a child snapshot to indicate the potential resource savings from deleting the selected snapshot.

In some embodiments, user interface 1100 allows the user to select multiple snapshots. In such embodiments, commands from menu 1121 may apply to all selected snapshots, and details pane 1125 may include information about each selected snapshot individually or in aggregate. In general, whenever the number of unique chunks associated with a graph or a portion thereof is needed as part of a query, whether for displaying resource usage information to a user via a user interface, allocating resource usage cost to a user, etc., snapshot service 150 can traverse the nodes of the graph(s) and add up the number of unique chunks assigned to nodes relevant to that query. For example, if the query was for the number of unique chunks attributed to a particular user, snapshot service 150 may traverse one or more graphs in graph database 152 that include or might include vertices associated with snapshots taken by the user and sum the number of unique chunks associated with those vertices. As another example, if the query was for the number of unique chunks attributed to all users, snapshot service 150 may traverse all graphs in graph database 152 and maintain a sum of unique blocks attributed to each unique user account. Whenever snapshot service 150 traversed a vertex attributed to a particular user account, snapshot service 150 increments the sum for that user account by the number of unique blocks assigned to that vertex.

In some embodiments, user interface 1100 includes indicators to associate a volume with its most recent snapshot. For example, indicator 1120A identifies snapshot 20 as being the most recent snapshot of volume zero of instance zero; indicator 1120B identifies snapshot 21 as being the most recent snapshot of volume one of instance zero; and indicator 1120C identifies snapshot 15 as being the most recent snapshot of volume zero of instance one.

In some embodiments, user interface 1100 may display menu 1121 upon selection of a volume. In some embodiments, the user interface may respond to an input on the indicators 1120A-1120C by displaying a menu for managing the volume. If an input was received related to indicator 1120C, user interface 1100 may display menu 1121, allowing a user to issue a command to either take a snapshot of the volume or configure a snapshot policy for the volume. If the command is to take a snapshot, the web or application service within the service provider causes snapshot service 150 to take a new snapshot of the volume. If the command is to configure a snapshot policy, the web or application service updates or causes snapshot service 150 to update a snapshot policy associated with the volume.

Figure 12:
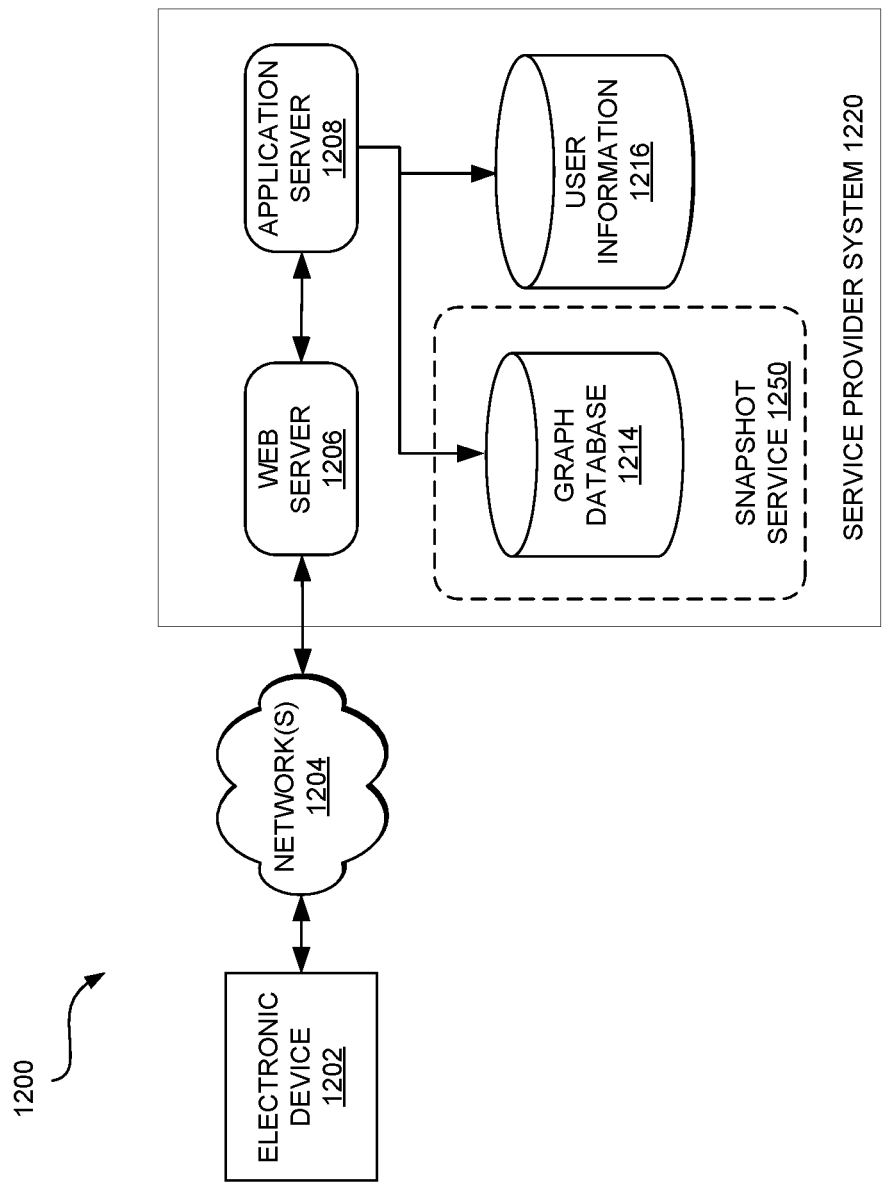
FIG. 12 is a block diagram of a service provider system providing snapshot management functionality according to some embodiments.

FIG. 12 is a block diagram of a service provider system 1220 providing snapshot management functionality according to some embodiments. Service provider system includes application server 1208 and web server 1206. Although not shown, service provider system 100 is implemented with one or more processors and one or more computer-readable media, as described herein.

Web server 1206 is in communication with electronic device 1202 via network(s) 1204. In some embodiments, the various requests and responses between electronic device 1202 and web server 1206 may be HyperText Transfer Protocol (HTTP) messages. Users, via electronic devices 1202, may interact with service provider system 1220 via a web portal provided via web server 1206 and application server 1208. For example, web server 1206 may receive a request for a page to manage snapshots, such as the one depicted in FIG. 11, and respond with data in messages for the electronic device to generate the page. In some embodiments, web server 1206 and/or application server 1208 might access user information 1216 to verify the identity of the user and identify the compute instances and or volumes associated with the user's account before accessing graph database 1214. In response to the request for a page to manage snapshots, web server 1206 and/or application server 1208 might obtain graph data either by accessing graph database 1214 directly or by requesting graph data from snapshot service 1250. Graph data may be representative of one or more graphs in the graph database associated with the user's account. The data may be in the form of the data structure stored in graph database 1214 or in another structured form/format (e.g., comma-separated values (CSV), extended markup language (XML), a "tree" type data structure known to those of skill in the art, etc.). In embodiments where a separate graph is maintained for each volume, web server 1206 and/or application server 1208 would obtain each graph associated with volumes owned by the user to generate the user interface. In other embodiments, web server 1206 and/or application server 1208 would obtain portions of a graph attributed to one or more volume(s) owned by the user (e.g., when a graph spans a family of snapshots that cover multiple volumes and cross account boundaries).

After obtaining graph information for the user's account, web server 1206 and/or application server 1208 may generate a response to transmit to electronic device 1202. The response may include HyperText Markup Language (HTML), JavaScript, scalable vector-graphics, image data, and the like for a web browser running on electronic device 1202 to render to the user. It should be understood that the web server 1206 and application server 1208 are not required and are merely example components for providing a user interface for managing snapshots.

Electronic device 1202, which may also be referred to as a client device and can be any appropriate device operable to send and receive requests, messages or information over network(s) 1204 and convey information to a user of the electronic device via a display (not shown), for example. Examples of such client devices include personal computers (PCs), cell phones, handheld messaging devices, laptop computers, set-top boxes, personal data assistants, electronic book readers, wearable electronic devices (e.g., glasses, wristbands, monitors), and the like.

Network(s) 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

Figure 13:
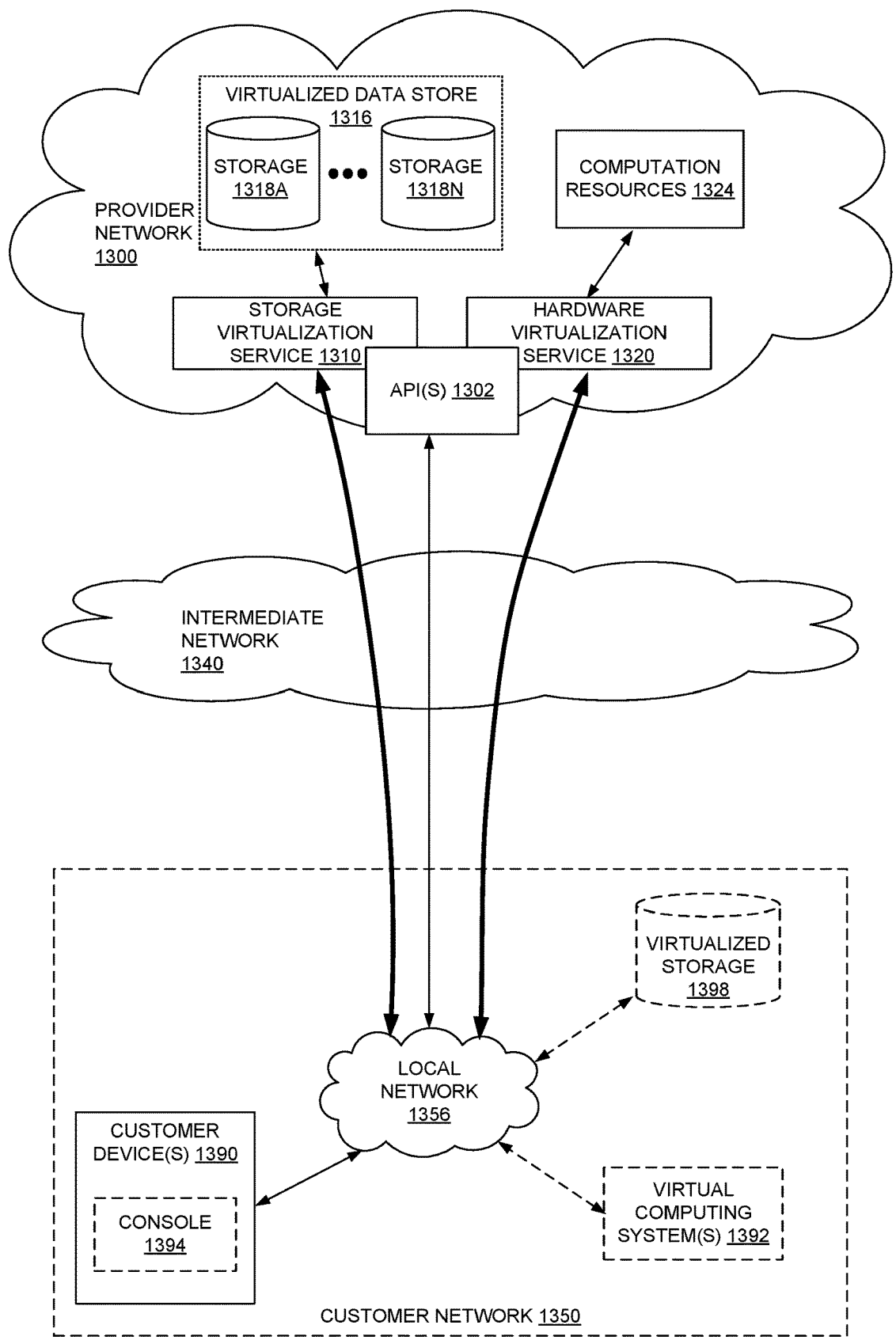
FIG. 13 is a block diagram of an example provider network that provides a storage virtualization service and a hardware virtualization service to customers according to some embodiments.

FIG. 13 is a block diagram of an example provider network that provides a storage virtualization service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage virtualization service 1310, for example via one or more APIs 1302, to access data from and store data to storage resources 1318A-1318N of a virtual data store 1316 provided by the provider network 1300. In some embodiments, a virtualized data store gateway (not shown) may be provided at the customer network 1350 that may locally cache at least some data, for example frequently accessed or critical data, and that may communicate with virtualized data store service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes, which appear to the user as local virtualized storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Figure 14:
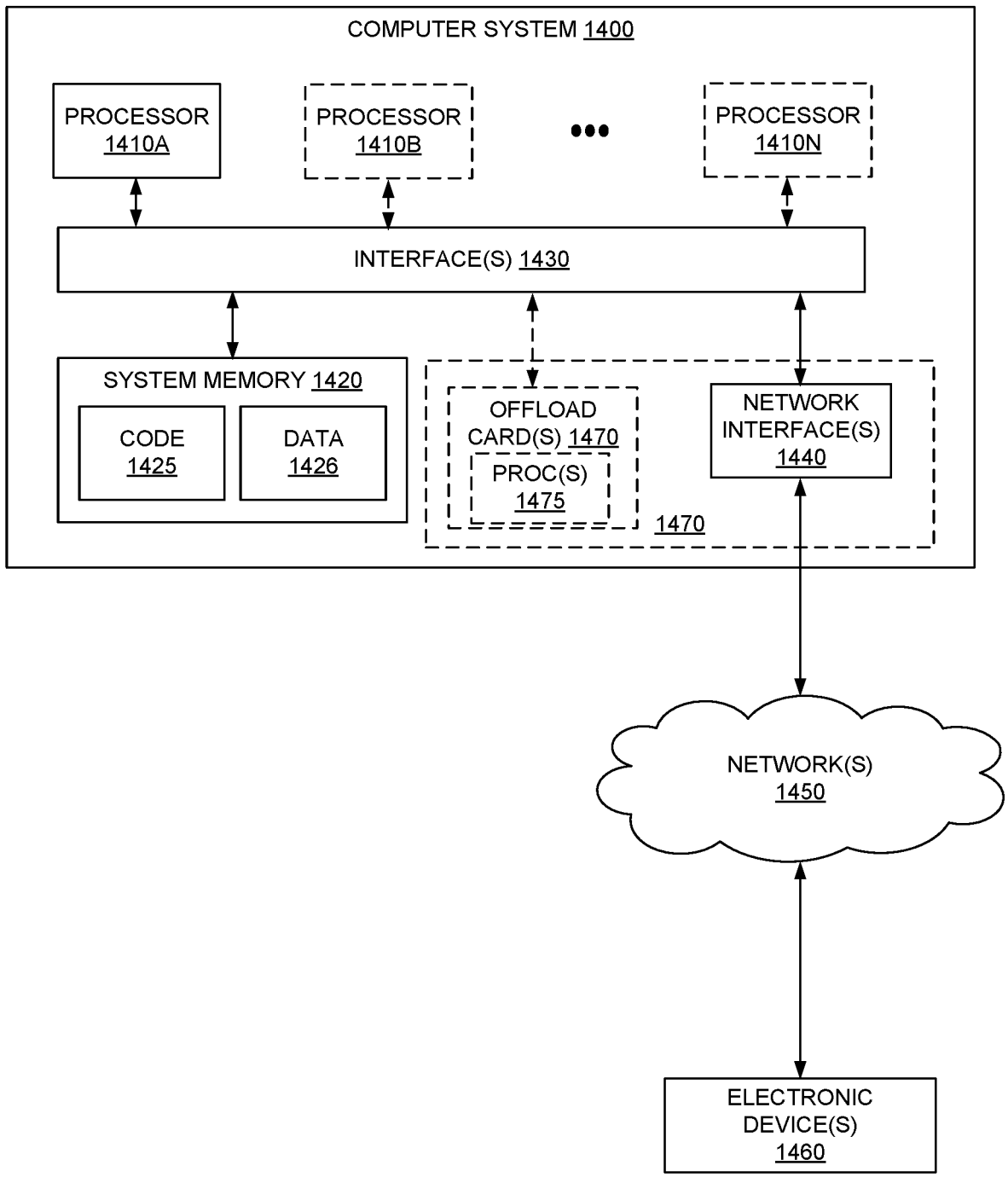
FIG. 14 is a block diagram illustrating an example computer system according to some embodiments.

FIG. 14 is a block diagram illustrating an example computer system 1400 that may be used in some embodiments. Computer system 1400 may implement all or a portion of the services described above (e.g., hardware virtualization service 110, storage virtualization service 120, snapshot service 150, provider frontend 140, web server 1206, application server 1208). In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). In some embodiments, computer system 1400 is part of a distributed computing environment utilizing several computer systems and components that are interconnected via communication links, using one or more computer networks or direct connections. Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices like 1400 carrying out other services described above. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage-area networks (SANs) such as Fibre Channel SANs, or via I/O any other suitable type of network and/or protocol.

In some embodiments, computer system 1400 includes one or more offload cards 1470 (including one or more processors 1475, and possibly including one or more network interfaces 1440) that are connected using I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments computer system 1400 may act as a host electronic device (e.g., operating as part of a hardware virtualization service) that hosts compute instances, and one or more offload cards 1470 execute a virtualization manager that can manage compute instances that execute on the host electronic device. As an example, in some embodiments offload card(s) 1470 can perform compute instance management operations such as pausing and/or un-pausing compute instances, launching and/or terminating compute instances, performing memory transfer/copying operations, etc. These management operations may, in some embodiments, be performed by offload card(s) 1470 in coordination with a hypervisor (e.g., upon a request from a hypervisor) that is executed by the other processors 1410A-1410N of computer system 1400. However, in some embodiments the virtualization manager implemented by offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations or aspects that add additional features to some embodiments. However, such notation should not be taken to mean that these are the only options or optional operations, and/or that blocks with solid borders are not optional in certain embodiments.

Reference numerals with suffix letters (e.g., 111A-111N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    generating, by a snapshot service of a service provider system, a plurality of snapshots of a volume, each snapshot having a corresponding manifest that identifies one or more chunks of data of the volume when the snapshot was taken, the snapshot service implemented by one or more electronic devices of the service provider system;
    maintaining, by the snapshot service, a graph data structure having a plurality of vertices each vertex of the plurality of vertices corresponding to one of the plurality of snapshots, wherein:
        each vertex of the plurality of vertices is at least a parent to or a child of another vertex, and
        each child vertex of the plurality of vertices comprises a value representing a number of chunks of data referenced in the manifest of the snapshot corresponding to the child vertex that are not referenced in the manifest of the snapshot corresponding to the parent vertex of the child vertex;
    calculating a resource usage based on a total number of unique chunks of data associated with the volume based at least in part on traversing the graph data structure; and
    providing the calculated resource usage in response to a query associated with the volume.

2. The computer-implemented method of claim 1, wherein each child vertex of the plurality of vertices corresponds to an incremental snapshot, and wherein a vertex within the plurality of vertices corresponds to a base snapshot and includes a base value representing a total number of chunks of data referenced in the manifest of the base snapshot.

3. The computer-implemented method of claim 2, wherein the calculating comprises adding at least the base value and the value of each of one or more child vertices of the plurality of vertices.

4. A computer-implemented method comprising:
    maintaining, by a snapshot service implemented by one or more electronic devices of a provider network, a graph data structure having a plurality of vertices, each vertex of the plurality of vertices corresponding to one of a plurality of snapshots, wherein:
        each vertex of the plurality of vertices is at least a parent to or a child of another vertex, and
        each child vertex of the plurality of vertices comprises a value representing a number of chunks of data referenced in the snapshot corresponding to the child vertex that are not referenced in the snapshot corresponding to the parent vertex of the child vertex;
    determining, by the snapshot service, a total number of unique chunks of data attributed to the plurality of snapshots based at least in part on traversing the graph data structure; and
    providing the total number of unique chunks in response to a query associated with one or more volumes corresponding to the plurality of snapshots.

5. The computer-implemented method of claim 4, wherein the plurality of snapshots correspond to a first volume.

6. The computer-implemented method of claim 5, wherein the graph data structure further includes a second plurality of vertices corresponding to a second plurality of snapshots of a second volume.

7. The computer-implemented method of claim 6, wherein the first volume and the second volume are associated with different accounts within a service provider system.

8. The computer-implemented method of claim 4, wherein each child vertex of the plurality of vertices corresponds to an incremental snapshot, and wherein a vertex within the plurality of vertices corresponds to a base snapshot and includes a base value representing a total number of chunks of data referenced by the base snapshot.

9. The computer-implemented method of claim 8, wherein the determining the total number of unique chunks of data comprises adding at least the base value and the value of each of one or more child vertices of the plurality of vertices.

10. The computer-implemented method of claim 4, wherein the maintaining comprises:
locating a vertex in the graph data structure corresponding to a most recent snapshot;
determining a new value for a new vertex, the new value representing a number of chunks of data referenced in a current snapshot that are not referenced in the most recent snapshot; and
adding the new vertex to the graph data structure, wherein the new vertex includes the new value and corresponds to the current snapshot.

11. The computer-implemented method of claim 4, wherein the maintaining comprises:
locating an old vertex in the graph data structure corresponding to a deleted snapshot;
determining that the old vertex has a child vertex;
modifying the graph data structure to change the child vertex to be a child of another vertex in the graph data structure;
updating the value of the child vertex to be a number of chunks of data referenced in the snapshot corresponding to the child vertex that are not referenced in the snapshot corresponding to the another vertex; and
removing the old vertex from the graph data structure.

12. The computer-implemented method of claim 11, wherein the another vertex is a parent to the removed old vertex or a sibling to the child vertex.

13. The computer-implemented method of claim 4, further comprising outputting a resource usage in response to a request from a web or application service, wherein the resource usage is based on the total number of unique chunks of data attributed to the plurality of snapshots.

14. A system comprising:
a first one or more electronic devices to implement a storage virtualization service; and
a second one or more electronic devices to implement a snapshot service, the second one or more electronic devices comprising a processor, the snapshot service including instructions that upon execution by the processor cause the snapshot service to:
maintain a graph data structure having a plurality of vertices, each vertex of the plurality of vertices corresponding to one of a plurality of snapshots, wherein:
each vertex of the plurality of vertices is at least a parent to or a child of another vertex, and
each child vertex of the plurality of vertices comprises a value representing a number of chunks of data referenced in the snapshot corresponding to the child vertex that are not referenced in the snapshot corresponding to the parent vertex of the child vertex;
determine a total number of unique chunks of data attributed to the plurality of snapshots based at least in part on traversing the graph data structure; and
provide the total number of unique chunks of data in response to a query associated with one or more volumes corresponding to the plurality of snapshots.

15. The system of claim 14, wherein the plurality of snapshots correspond to a first volume.

16. The system of claim 15, wherein the graph data structure further includes a second plurality of vertices, each vertex of the second plurality of vertices corresponding to one of a second plurality of snapshots of a second volume.

17. The system of claim 16, wherein the first volume and the second volume are associated with different accounts within a service provider system.

18. The system of claim 14, wherein each child vertex of the plurality of vertices corresponds to an incremental snapshot, and wherein a vertex within the plurality of vertices corresponds to a base snapshot and includes a base value representing a total number of chunks of data referenced by the base snapshot.

19. The system of claim 18, wherein to determine the total number of unique chunks of data, the instructions upon execution cause the snapshot service to add at least the base value and the value of each of one or more child vertices of the plurality of vertices.

20. The system of claim 14, further comprising:
a web service implemented by a third one or more electronic devices, the web service including instructions that upon execution cause the web service to:
in response to a request from a user device in communication with the web service via an intermediate network, obtain data representing at least a portion of the graph data structure from the snapshot service; and
transmit the obtained data to the user device.

* * * * *